United States Patent [19]

Numbers

[11] 4,110,021
[45] Aug. 29, 1978

[54] MICRO FICHE INDEXER

[75] Inventor: Jody L. Numbers, Scottsdale, Ariz.

[73] Assignees: Ralph A. Sickles; Doris E. Sickles, both of Tempe, Ariz.; Co-Trustees of the Ralph A. Sickles Family Estate

[21] Appl. No.: 834,391

[22] Filed: Sep. 19, 1977

[51] Int. Cl.² .......................................... G03B 23/08
[52] U.S. Cl. .................................................. 353/27 R
[58] Field of Search .................... 353/25, 27 R, 27 A; 40/79, 106.1

[56] References Cited

U.S. PATENT DOCUMENTS

| 3,716,293 | 2/1973 | Kitano et al. | 353/27 R |
| 3,778,141 | 12/1973 | Peterpaul | 353/27 R |

Primary Examiner—Harry N. Haroian
Attorney, Agent, or Firm—Dean, Flickinger & Robertson

[57] ABSTRACT

A micro fiche indexer which shifts a fiche containing a plurality of images in horizontal rows both laterally and vertically under the influence of a single operating member that is actuated by the user. It comprises a screen on which an enlarged reproduction of an image on the fiche is cast together with a light source included as a part of an optical system, and a microswitch which cuts out the light source as the fiche is shifted to bring into viewing position a new image. The operating mechanism for causing the shifting includes a pushbutton mounted in a cabinet below the screen and which is carried at one end of a lever that is pivoted on a fulcrum intermediate its ends, whereby the other end of the lever raises an actuating panel which, due to its upward movement, first shifts a holder in which the fiche is mounted laterally from one station to another and at the end of a row, moves the fiche holder vertically from one row to another.

14 Claims, 17 Drawing Figures

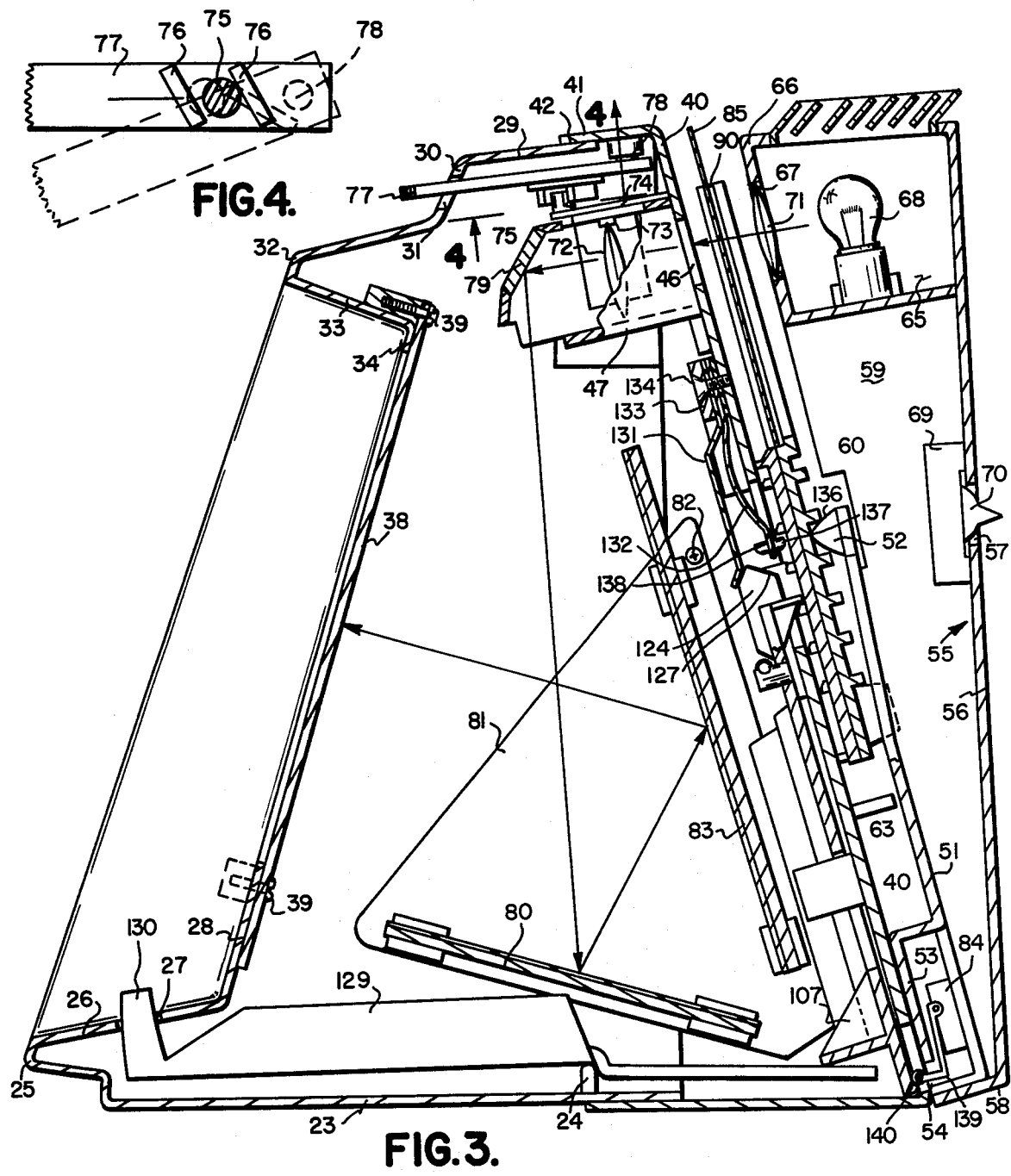

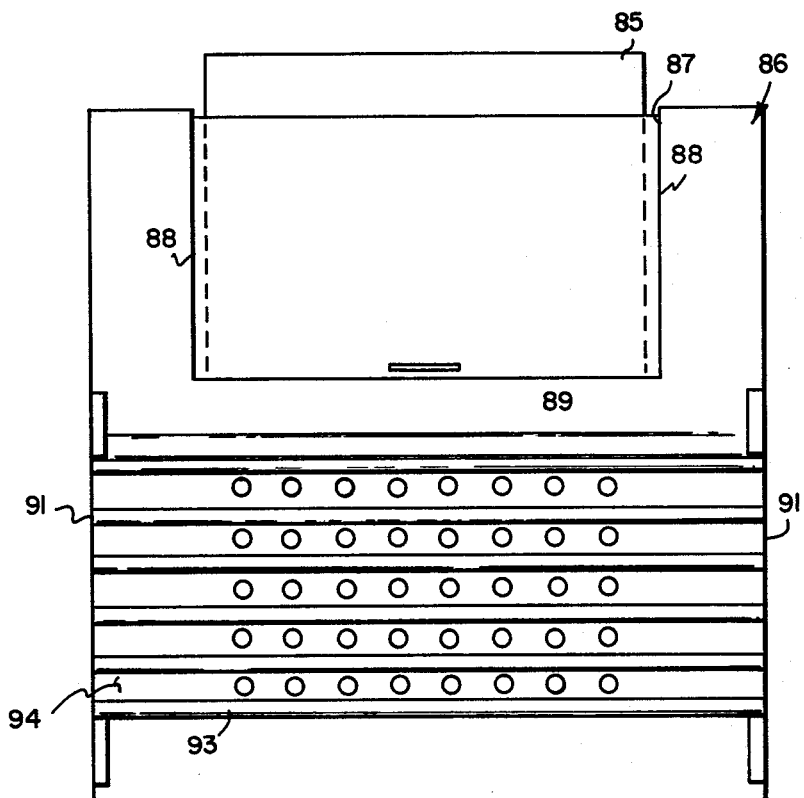
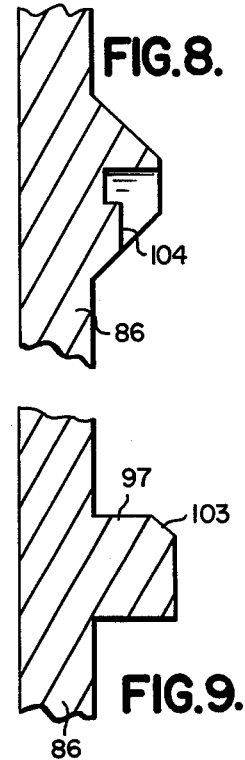
FIG.6.
FIG.8.
FIG.9.
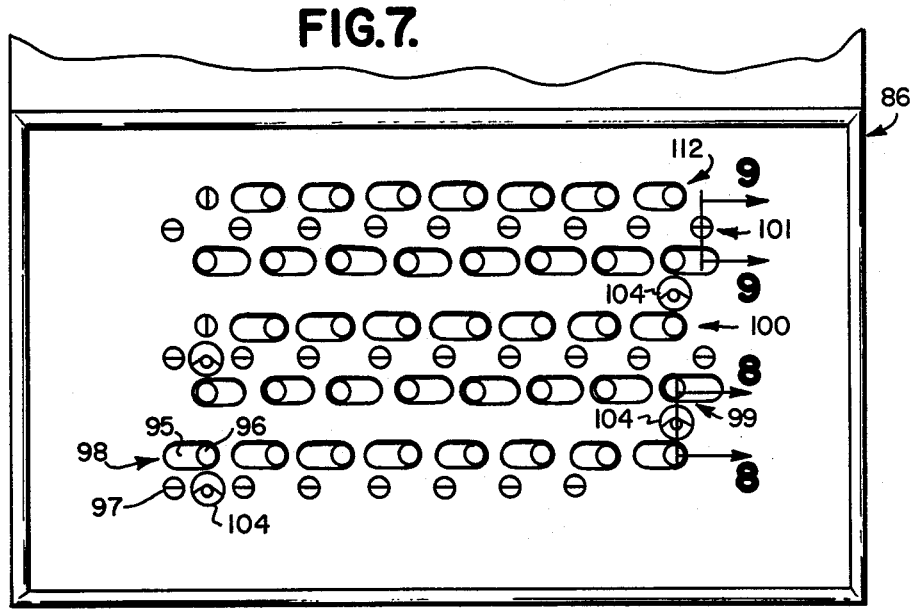
FIG.7.

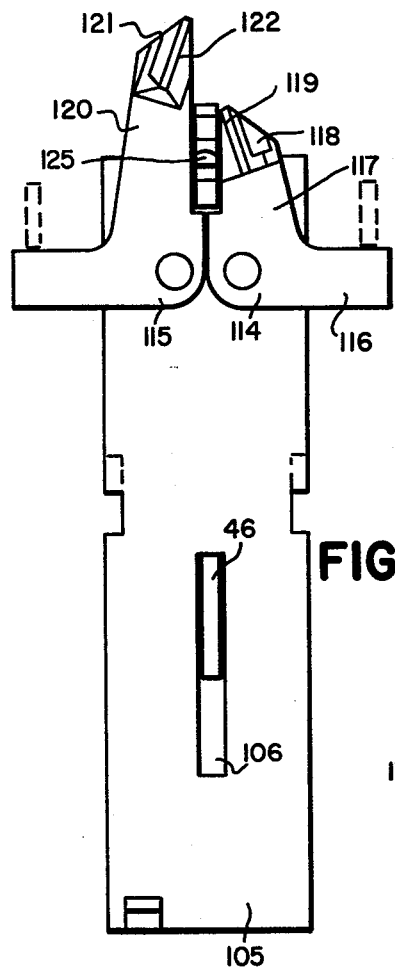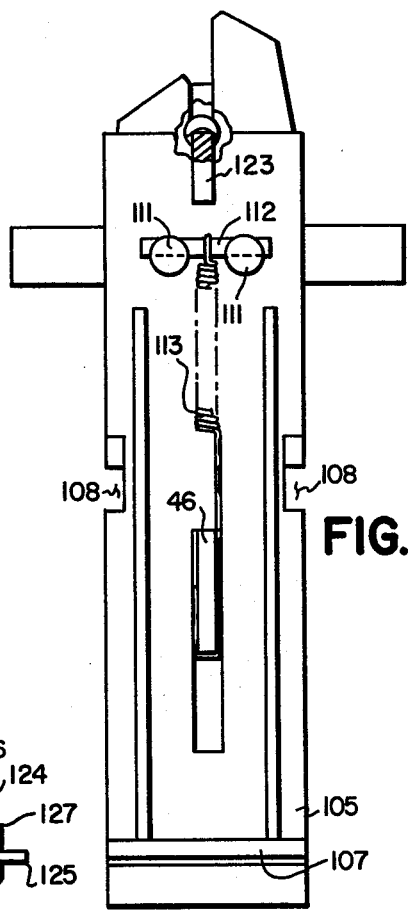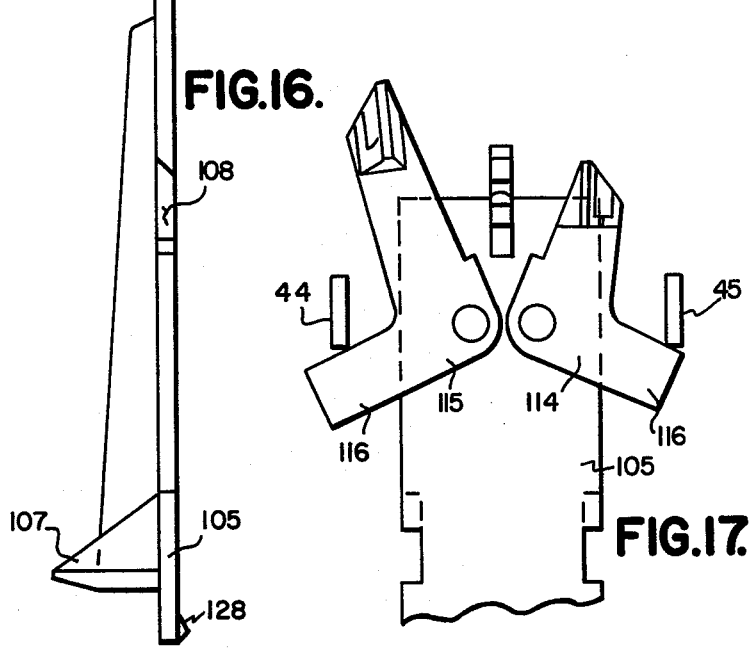

MICRO FICHE INDEXER

The present invention has to do with micro fiche handling devices and is concerned primarily with an indexer which moves a fiche holder horizontally in a step-by-step fashion and vertically from one horizontal row of images to another, with both of these indexing steps being carried out in sequence by the operation of a single manual control such as a pushbutton.

BACKGROUND OF THE INVENTION

A micro-fiche of the type with which this invention is concerned comprises a rectangular piece of heavy film or plastic on which has been developed a plurality of horizontal rows of pictures, scenes or images which are quite small and must be enlarged to allow for a clear and detailed viewing thereof. A handler or indexer for the micro fiche must provide for the exhibition of only one image at a time on a screen and usually will have a large number of such images.

It is believed that the closest prior art to the subject invention is U.S. Pat. No. 4,029,406 which issued June 14, 1977, on a Micro Fiche Handler. The apparatus disclosed in this patent is designed primarily for industrial and commercial use and is highly complex. It includes two separate actuating devices for causing horizontal and vertical indexing. Moreover, when the fiche is being shifted from one position to another, the light source of the projector is still in effect and the glaring light produced thereby is objectionable to the user of the machine. It is highly expensive to manufacture as compared to the subject indexer and for that reason is not ordinarily intended for commercial distribution, to dwellers in private homes and small commercial institutions.

It is believed that a micro fiche indexer which is the epitome of simplicity, which is literally fool-proof in operation, which may be cheaply manufactured, and which disables the light source of the optical system as the fiche is being indexed will fill a long-felt public need.

OBJECTS OF THE INVENTION

With the foregoing conditions in mind, the present invention has in view the following objectives:

1. To provide a highly simplified micro fiche indexer which may be cheaply produced and includes a fiche holder which is shifted both longitudinally and vertically under the influence of a single operating member;
2. To provide a micro fiche indexer of the type noted which includes elements many of which are of plastic and reformed by ejection molding;
3. To provide in a micro fiche indexer of the character aforesaid an optical system for projecting a fiche image onto a screen which is mounted in a cabinet that includes all the mechanisms and elements of the indexer. The optical system includes a light source which is cut out every time the fiche holder is shifted;
4. To provide in a micro fiche indexer of the kind described an operating member in the form of a pushbutton that is mounted in the cabinet below the screen and on one end of a lever which is pivoted intermediate its ends;
5. To provide in a micro fiche indexer of the type noted an actuating panel which is engaged by the lever at the end remote from the pushbutton so that it is moved upwardly when the pushbutton is depressed. This actuating panel carries mechanisms and devices which shift the fiche holder both horizontally and vertically;
6. To provide in a micro fiche indexer of the character aforesaid a fiche holder in which a fiche is removably mounted and which is formed on one face with a plurality of horizontal ribs which define horizontal grooves, any one of which receives a guide mounted on the cabinet and the other face of which is formed with a plurality of pins arranged in horizontal rows, with these rows of pins being spaced apart corresponding to the placing of the ribs on the opposite face, any one of which pins may be engaged by mechanisms on the actuating panel to index the holder longitudinally a distance exactly the same as the width of one fiche image;
7. To provide in a micro fiche indexer of the type noted means for securely locking the fiche holder in position after it has been indexed;
8. To provide in a micro fiche indexer of the type described a plurality of vertical indexing pins which project from the face of the holder opposite to that formed by the ribs, there being a vertical indexing pin at one end of each row of horizontal indexing pins except for the top row of the latter.

Various other and more detailed objects and advantages of the invention such as arise in connection with carrying out the above-noted ideas in a practical embodiment will in part become apparent and in part be hereinafter stated as the description of the invention proceeds.

SUMMARY OF THE INVENTION

The foregoing objects are achieved by providing a cabinet consisting of a front part and a rear part which are secured together after the mechanism of the indexer have been assembled on the respective parts. The front part of the cabinet includes a front wall that is inclined from a larger bottom wall to a narrower top wall. This front wall is formed with a sunken opening in which a projection screen is mounted.

The rear part of the cabinet is formed with a compartment at its upper end in which an electric light is mounted. The front wall of this compartment carries a lens which cooperates with a lens that is movably mounted in the front part so that the distance between the two lenses may be adjusted for focusing purposes. A focal adjusting arm is pivotably mounted in the upper part of the front part and projects through an opening in the front wall above the screen where it is readily accessible to a user.

Light from the lamp passes through the lens in the rear cabinet part, that portion of the fiche having an image to be projected, an opening in the rear wall of the rear cabinet part, the adjustable lens, and onto a mirror that is mounted on a bracket on the front part and at an angle so that the light from the image is directed downwardly to another mirror of larger size than the first-mentioned mirror, and from this larger mirror onto another mirror that is still larger, and thence is projected onto the screen. Provision is made for conducting a source of direct current to the light and is under the control of a switch mounted in the rear wall of the rear cabinet part. A microswitch is in series with the switch aforesaid and is opened when the fiche holder is being shifted, as will be later described. Thus, the electric light is de-energized during shifting of the fiche holder.

The front wall of the front cabinet part has an inclined bottom wall formed with a slot through which projects a tab which for the purposes of this specification is called a "pushbutton" and is mounted at one end of a lever that extends rearwardly over the bottom cabinet wall in spaced relation thereto and is pivoted intermediate its ends so that depression of the pushbutton elevates the end adjacent to the rear cabinet wall.

The rear wall of the front cabinet part, which is also the front wall of the rear part, is also inclined from the bottom to the top, and an actuating panel has its lower end adjacent to the lower end of the rear cabinet wall and under normal or inactive conditions, it stands upwardly in a direction that is at an acute angle with respect to the rear cabinet wall. Extending forwardly of this actuating panel at the lower end thereof is a bracket which is engaged by the end portion of the operating lever so that depression of the pushbutton raises the actuating panel. As this motion is initiated, the microswitch is opened to cut off current to the light.

The rear wall of the front cabinet part is formed with an inwardly extending tab in its lower regions. The actuating panel has a slot which receives this tab and the opposite ends of which limit vertical movement of the actuating panel in both directions. Adjacent to its upper end the actuating panel carries a pair of pins which are symmetrically spaced apart relative to the center of the panel and project from both faces thereof. On the forward side of the actuating panel a cross bar is connected to these pins. The upper end of a contracting coil spring is anchored to this cross bar and its lower end is secured to the tab which projects inwardly from the rear wall. Thus, the actuating panel is constantly urged downwardly in the cabinet by the spring and is moved upwardly by the actuating level when the pushbutton is depressed.

A fiche holder of a fairly heavy molded plastic is of a rectangular shape and opening into its upper edge is a recess which receives the major portion of a fiche. This recess is defined by thin front and rear layers of the fiche holder and side walls. The fiche holder is removably positioned between the rear part and the rear wall of the front part with a rearwardly extending flange on the latter limiting downward movement of the fiche holder. Formed integrally with the rear face of the fiche holder are a plurality of horizontal ribs which are uniformly spaced apart a distance corresponding to the height of one horizontal row of images on the fiche. These ribs define grooves any one of which receives a horizontal guide bar mounted on the upper end of a resilient strip, the lower end of which is secured to the lower end of the rear wall of the front casing. The front face of the fiche is formed with a plurality of rows of horizontal indexing pins, the rows being spaced apart a distance corresponding to the spacing of alternate ribs on the rear face. Above and below each of these rows of horizontal indexing pins, with the exception of the bottom row, and above this bottom row are rows of elongated recesses with an aperture which extends through the holder at one end of each of these recesses. One of these openings receives a locking pin carried at the end of a spring upon completion of lateral indexing of the fiche holder.

The operation of the fiche holder is unidirectional; thus it is indexed across the top row of pins in one direction; then after vertical indexing along the same row of pins in the opposite direction for the full length of this row; and then upon vertical indexing again, the indexing will be in the opposite direction along the next row of pins; and when the end of that row is reached, vertical indexing for the recesses below this last-mentioned row of pins; and upon completion of that stroke, vertical indexing again which is caused by the bottom row of pins.

Also extending from the front face of the fiche holder are a plurality of vertical indexing pins each of which is located at one end of a row of horizontal indexing pins, there being one less vertical indexing pin than there are number of rows of elongated recesses. The underside of each vertical indexing pin is formed with a notch which receives a pin extending from the actuating panel.

Mounted on the rear side of the actuating panel adjacent to its upper end is a bracket which carries the vertical indexing pin. Mounted on the rear face of the actuating panel are a pair of bell cranks, one having a short arm projecting above the top edge of the actuating panel and the other having a longer arm projecting above this top edge. The free end of each of these arms of the bell cranks is formed with a cam lip. One of these lips engages the horizontal indexing pins for movement in one direction and the cam lip on the other, for movement in the opposite direction. The rear wall of the front casing part is formed with a pair of inwardly extending tabs located on opposite sides of the upper end portions of the actuating panel, in which position they are engaged by the horizontal arms of the bell cranks upon upward movement of the actuating panel to cause shifting of the fiche holder in one direction or the other. The rear wall of the front cabinet part is formed with an opening through which the indexing pins pass and engage complemental elements on the fiche holder. Depending from a spring anchor secured to the inner face of the rear wall of the front cabinet are two leaf springs in spaced relation. The lower end of the spring closest to the rear wall carries the locking pin which fits in one of the apertures at the end of a recess in the fiche holder. The other leaf spring is longer than the one mentioned and its lower end has a cam foot which engages a cam surface on the bracket mounted on the actuating panel which carries the vertical indexing pin. On upward movement of the actuating panel, this spring counterbalances or offsets the elasticity of the guide-carrying strip so that upward movement of the actuating panel causes the fiche holder to move upwardly and cause the guide bar to ride over a rib and become seated in the next-adjacent groove below the groove in which it was originally seated.

There are certain other features which are incident to assembling of the aforedescribed mechanism which will be later described.

For a full and more complete understanding of the invention, reference may be had to the following description and accompanying drawings, wherein:

FIG. 3 is a longitudinal vertical section through the assembled cabinet, being taken on the plane of the line 3—3 of FIG. 1;

FIG. 4 is a detail bottom plan view taken on an enlarged scale of the focal-adjusting arm;

FIG. 6 is a detailed elevation looking at the rear face of the fiche holder and fiche therein;

FIG. 7 is a detailed elevation looking at the front face of the fiche holder;

FIG. 8 is a detailed section on an enlarged scale through one of the vertical indexing pins, being taken on the plane represented by the line 8 of FIG. 7;

FIG. 9 is a section on an enlarged scale through one of the horizontal indexing pins;

FIG. 14 is a detail of the actuating panel and bell cranks looking from the front;

FIG. 15 is a view similar to FIG. 14 looking at the rear of the actuating panel;

FIG. 16 is a view in side elevation of the actuating panel; and

FIG. 17 is an elevation of the upper portion of the actuating panel showing how the bell cranks are operated.

DESCRIPTION OF A PREFERRED EMBODIMENT

Figure 1:
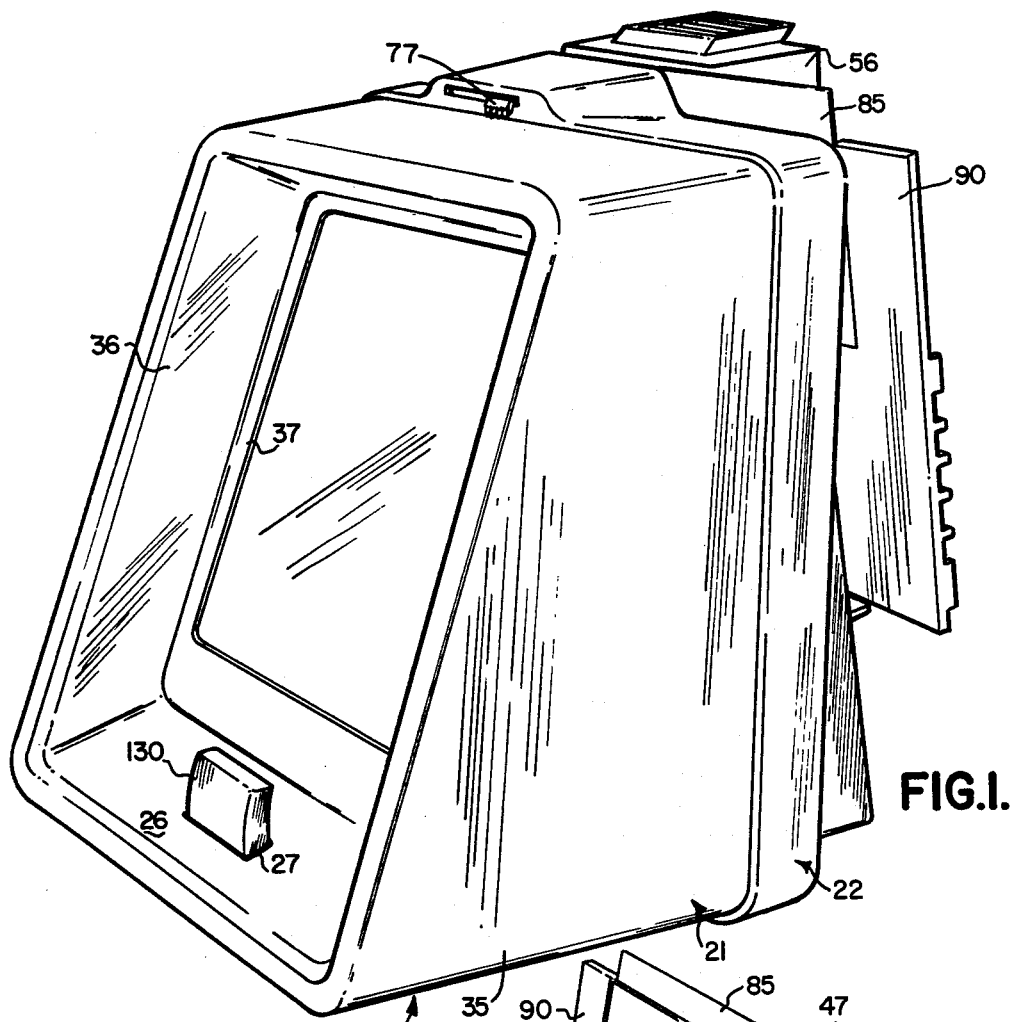
FIG. 1 is a perspective looking from the front and one side of the micro fiche indexer of this invention.

In describing the preferred embodiment illustrated in the drawings, the structure of the cabinet will first be described, then the optical or projection system, the micro fiche holder, and finally the actuating mechanism for indexing the holder both horizontally and vertically.

THE CABINET

Figure 2:
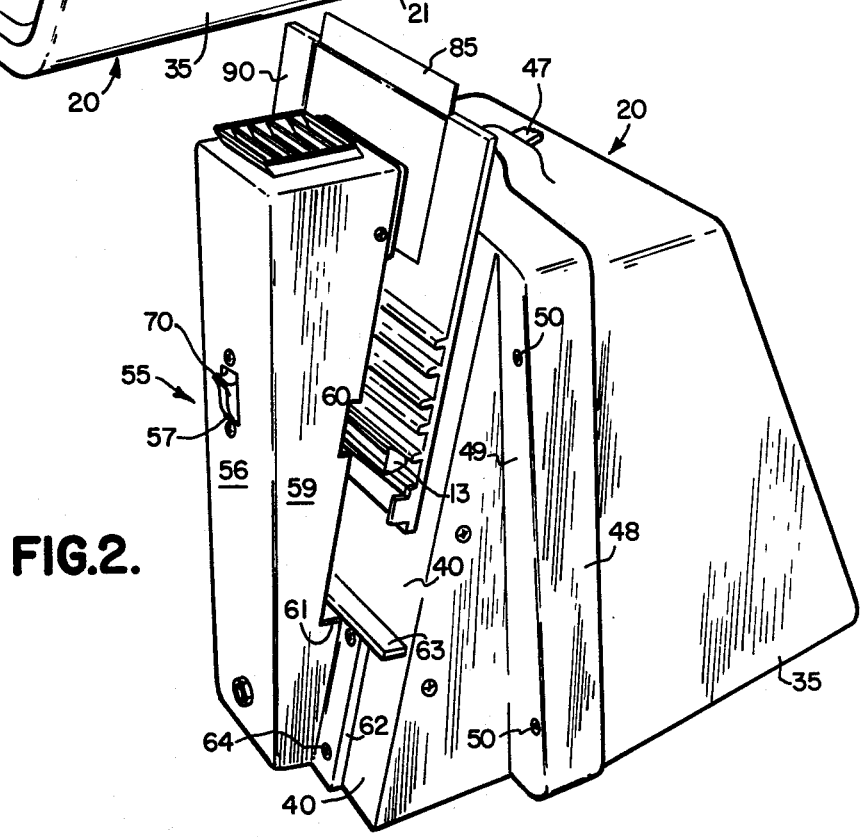
FIG. 2 is another perspective looking from the rear.

Referring first more particularly to FIGS. 1, 2, and 3, the cabinet is designated generally 20 and comprises a front part referred to in its entirety by the reference character 21 and a rear part 22. The front part includes a bottom wall 23 presenting an upturned flange 24 midway its extremities for a purpose to be later described. The bottom wall 23 at the front end terminates in a U-shaped structure 25 presenting an inclined wall 26 formed with a slot 27 and terminating in a flange 28 which defines the bottom edge of a so-called sunken opening. A top wall 29 is formed with an inclined portion 30 having an orifice 31 for a purpose to be later described, and terminates in another U-shaped structure 32 presenting an inclined wall 33 terminating in a lip 34 which defines the top edge of the aforesaid sunken opening.

As shown more clearly in FIG. 1, the bottom wall 23 and top wall 29 are joined by side walls 35. Extending inwardly from the front edges of side walls 35 are inclined flanges 36 which terminate at inturned flanges 37 which, together with the flanges 28 and 34, complete the definition of the sunken opening. A projection screen 38 has peripheral portions engaging the flanges 28, 34 and 37 and is secured in position by screw bolts 39 (FIG. 3).

Strictly speaking, the front cabinet part 21 is open at the rear but is closed by the front wall 40 of rear cabinet part 22. This wall 40 may be considered as the rear wall of the front cabinet part or the front wall of the rear cabinet part. It is formed with a top wall 41, an edge portion of which overlaps the top wall 29, as indicated at 42, and secured thereto. It extends downwardly at an acute angle with respect to the vertical with its lower edge being spaced from the rear edge of bottom wall 23. Wall 40 is formed with an opening 43 having the shape illustrated in FIG. 5 and projecting inwardly from the front face of wall 40 are two tabs 44 and 45 slightly above the horizontal medium of wall 40, and a tongue 46 which is positioned centrally and above the bottom edge of wall 40 also extends inwardly from wall 40. The function of these tabs 44 and 45 and tongue 46 will be later described.

As shown in FIG. 3, wall 40 is formed with an aperture 46 and extending inwardly therefrom just below this aperture is an inclined shelf 47 which constitutes the bottom of a lens holder.

Rear cabinet part 22 also includes side walls 48 as illustrated in FIGS. 1 and 2, with flanges 49 being turned inwardly at the rear edges thereof. Screws 50 pass through openings in flanges 49 and are threaded into sockets (not illustrated) formed in the rear edges of side walls 35 of the front cabinet part to complete the assembled relation of the cabinet parts. A resilient strip 51 carries a guide bar 52 at its upper end and has a lower offset portion 53 which overlaps and is secured to the lower edge portion of wall 40. The latter is formed in an opening at 54 for a purpose to be later described. A support for the lamp housing is designated generally 55. It comprises an end strip 56 formed with an aperture 57 and a bottom flange 58 (FIG. 3).

Referring now to FIG. 2, support 55 includes side walls 59 formed with a recess at 60 which accommodates movement of guide bar 52. Extending outwardly from the free edges of side walls 59 below shoulders 61 are flanges 62 which engage rear wall 40 below a horizontal abutment 63 which projects rearwardly thereof. Flanges 62 are secured to this portion of wall 40 by screws 64.

Referring to FIG. 3, the upper portion of support 55 is provided with a lamp housing 65 having a front wall 66 formed with a circular opening 67.

The Optical System

An electric light 68 is mounted in lamp housing 65 and is connected to an appropriate source of direct current which is controlled by a switch 69 having an operating member 70 which extends through opening 57 in support wall 56. Mounted in opening 69 is a lens 71. A second lens 72 is movably mounted opposite to lens 71. It is adjustable relative thereto due to being dependent from a lug 73 mounted on the underside of a dove tail slide 74 having projection 75 upstanding from its free end. This projection is shown more clearly in FIG. 4. A pair of cam tabs 76 are mounted on a swinging arm 77 which is pivoted at 78 to the underside of top wall 41. This arm 77 extends through opening 31 in inclined top wall portion 30 as shown in FIG. 3 and its end edge may be serrated to facilitate its being swung by manual engagement to adjust lens 72 relative to lens 71 to achieve proper focusing.

Light from lamp 68 passes through lens 71, thence through an image on the micro fiche (to be later described), through opening 46, and then through lens 72.

The light beam now engages a reflector 79 that is supported from shelf or bracket 47. The reflected light beam then passes downwardly where it engages a larger reflector 80 that is carried by a pair of triangular brackets 81 that are secured to the inner faces of side walls 35 by screw bolts, one of which is shown at 82. From reflector 80, the light beam is directed onto another reflector 83 which is larger than reflector 80, and thence projected onto screen 38.

A microswitch shown at 84 is mounted at the lower end of the rear cabinet part 22 and is in series with the electric light 68 controlled by switch 69. When switches 69 and 84 are closed, light 68 is energized and an enlarged image on the fiche through which the light beam passes is projected onto screen 38. However, should either of the switches be open, the electric current to lamp 68 is discontinued.

The Micro Fiche Holder

Referring now more particularly to FIGS. 6, 7, 8, and 9, a micro fiche is indicated at 85. It is deemed unnecessary to here reproduce the plurality of images, scenes or pictures which are developed on fiche 85. It is of a heavy film having a required degree of rigidity and is rectangular in shape. The images thereon are arranged in horizontal rows with the images in one row being in direct vertical alignment with those in other horizontal rows.

A fiche holder is designated generally 86. It is fairly thick and, while being of plastic, is rigid to a high degree. It is formed with a rectangular recess 87 which receives the major portion of fiche 85. This recess 87 is defined by side edges 88 and bottom edge 89 of recess 87 and thin spaced-apart films 90 of the plastic from which fiche holder 86 is made on opposite sides of fiche 85, as shown in FIG. 3. The fiche 85 is slid inbetween these films or plies 90 until its lower edge engages the bottom edge 89 of recess 87. Fiche holder 86 is also rectangular in shape, presenting side edges 91 and a bottom edge 92. When the fiche holder is initially positioned, bottom edge 92 engages abutment 63 which is illustrated in FIG. 3. It is evident that the number of sections or images in the horizontal rows may vary as may the number of such horizontal rows. However, purely for purposes of illustration, it will be assumed that there are five horizontal rows with eight images in each row for the purposes of this specification.

FIG. 6 illustrates the rear face of the fiche holder. Outstanding from this face and formed integrally therewith are six horizontal ribs 93. These ribs 93 are spaced apart a distance corresponding to the vertical height of the images and define grooves 94, there being five such grooves for the five rows of images.

FIG. 7 illustrates the front face of fiche holder 86. Extending horizontally across this face at a distance spaced from the bottom edge 92 are eight elongated recesses 95 each having straight parallel sides and rounded ends with an aperture 96 extending entirely through the holder. The recesses 95 have bottom surfaces and open onto the front face. The purpose of the aperture 96 will be later described. Below the bottom row of recesses 95, seven horizontal indexing pins 97 project from the front face. It will be noted that there is a pin 97 at the closed end of each recess 95 with the exception of the one at the right-hand end of FIG. 7. No such pin is needed at this location because when the fiche holder is finally positioned, one of the images in the bottom row will be opposite to this end recess 95 in the bottom row.

For the purposes of this specification, the bottom row of recesses 95 is represented by the arrow 98. A second horizontal row of recesses 99 is positioned above row 98 but the apertures 96 are at the opposite ends of the recesses 95 as compared to the recesses 95 in row 98. Above row 98 is a row of eight horizontal indexing pins 97. Above this second row of horizontal indexing is a third row 100 of recesses 95 with the apertures 96 being at the same ends as those in row 98. Above row 100 is another row 101 of eight recesses 95 with the apertures 96 being at the ends opposite to those in the recesses of row 100. Above row 101 is a row of eight horizontal indexing pins 97 and above this row of indexing pins is a fifth row 102 of recesses 95 and apertures 96.

Referring for the moment more particularly to FIG. 9, one of the horizontal indexing pins 97 is shown in section. It is shown as having an inclined or cam face at 103 which will be on the top side of the pin.

A vertical indexing pin is shown at 104 as being located between the last two pins 97 at the left-hand side of bottom row 98. A sectional view of this pin is shown in FIG. 8. There is another one of these vertical indexing pins 104 at the right-hand side of the space between rows 98 and 99. A third one of the vertical indexing pins 104 is shown between rows 99 and 100, and a fourth vertical indexing pin 104 between rows 100 and 101. It is evident that while there are five horizontal rows of the recesses 95, there is only three rows of the horizontal indexing pins 97. This is because after the lowermost vertical indexing pin 104 has shifted holder 86 the distance of one groove 94 after finishing the row 98, the second vertical indexing pin 104 will move the holder up the same distance, but in this position, the second or intermediate horizontal row of indexing pins 97 will be effective to shift the holder in opposite directions for rows 99 and 100 of the recesses 95. This is also true of the third vertical indexing pin 104 which will shift the holder so that the top or third row of horizontal indexing pins will be effective to shift the holder for rows 101 and 102 in opposite directions.

The Actuating Mechanism

Figure 5:
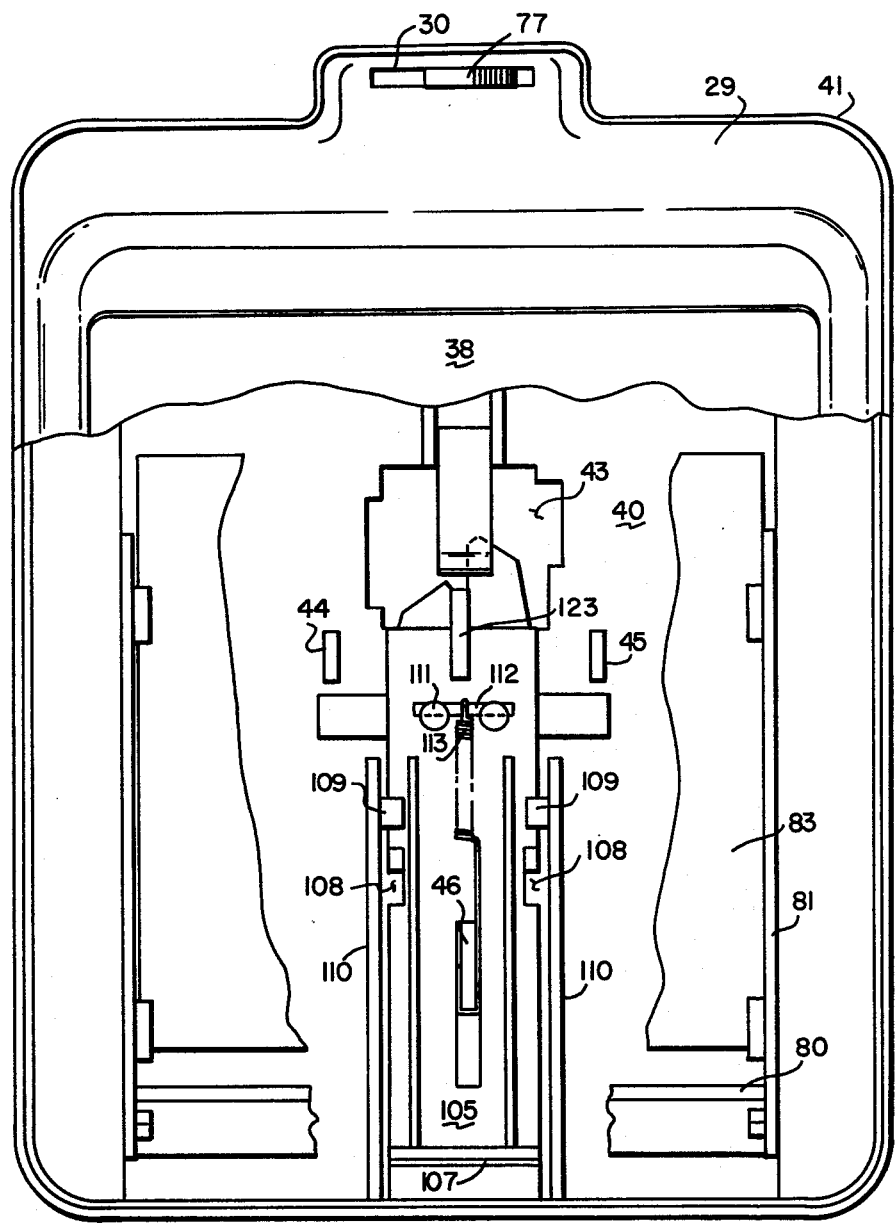
FIG. 5 is a view in front elevation with portions being broken away to permit illustration of the mechanism on the interior of the cabinet.

The actuating mechanism includes as its characteristic and essential element an actuating panel 105 illustrated in FIGS. 14, 15 and 16. It is of metal and is formed with a slot 106 which receives the tongue 46. FIG. 14 is a front view of this panel 105 and projecting forwardly thereof is a bracket 107 which is shown more clearly in FIG. 16. Recesses 108 open into the side edges and, as shown in FIG. 5, tabs 109 which extend inwardly from strips 110 mounted or cabinet wall 40 may be passed through these recesses 108 and assume a position overlapping side edge portions of panel 105 to restrain the latter in the slight amount of pivotal movement which is possible.

Adjacent to its upper end, panel 105 is formed with openings symmetrical to its longitudinal center and positioned in these openings are two cylindrical stub shafts 111 which project beyond both faces of panel 105. On the front face, as shown in FIG. 14, a bar 112 spans the shafts 111 with the bar being seated in recesses (not identified by reference characters) in the upper portions of the shafts. A contracting coil spring 113 has its upper end secured to bar 112 and its lower end is anchored to the tongue 46. As the latter is secured to the cabinet wall 40, the tendency of the spring 113 is to urge panel 105 downwardly.

As shown in FIG. 15, which is a rear view of the panel 105, a pair of bell cranks 114 and 115 are pivotably mounted on those portions of shafts 111 which project beyond the rear face of panel 105. Both of the bell cranks 114 and 15 have an arm 116 which aligns when panel 105 is in its lowermost position. Bell crank 114 has a short vertical arm 117 the upper end of which is inclined as indicated at 118, and extending inwardly from the end portion of the bell crank at the inclined surface 115 is a cam lip 119 which is adapted to engage the horizontal indexing pins in one direction of movement as will be later pointed out.

Bell crank 115 has a vertical arm 120 which is longer than the arm 117 of bell crank 116 and the free edge of this arm is inclined as indicated at 121, and projecting from this end portion of arm 120 is a cam lip 122 which is adapted to engage the horizontal indexing pins 97 when the fiche holder 86 is moving in a direction opposite to that which provides for engagement of the lip 119 in that direction.

As shown more clearly in FIG. 14, a slot 123 enters the panel 105 from its upper edge at the center thereof. Received in this slot is a plate 124 which is more clearly shown in FIG. 16. A portion of this plate extends to the rear and mounted thereon is a pin 125 which is adapted to engage one of the vertical indexing pins 104. At its upper end plate 124 has cam surfaces 126 and 127 for a purpose to be later described.

Referring for the moment more particularly to FIG. 17, it will be seen that on upward movement of panel 105, horizontal arms 116 of the bell cranks engage tabs 45 which are fixed to cabinet wall 40 and cause the bell cranks to swing from the horizontal position to the position illustrated in FIG. 17. Attention is also called to FIG. 16 which shows a pivot member 128 at the lower end of panel 105.

Figure 10:
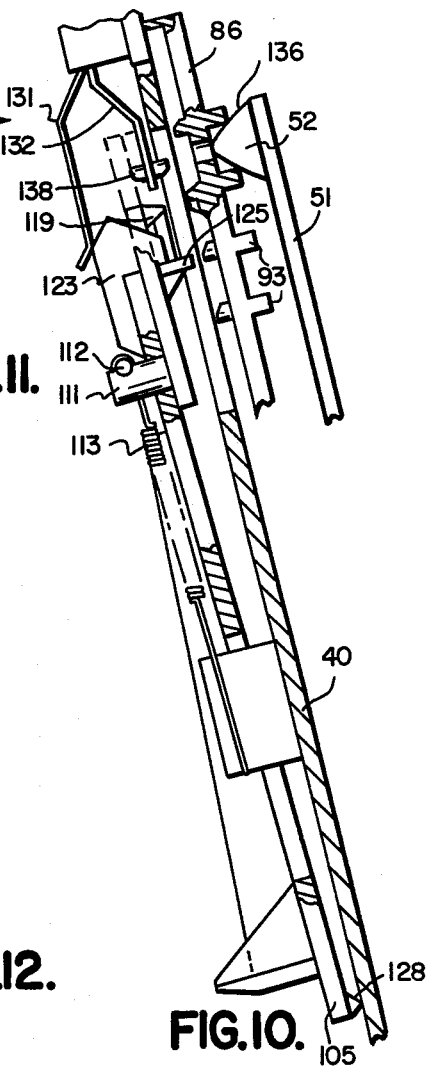
FIG. 10 is a side view mostly in elevation but partially in section of the actuating panel and mechanism immediately associated therewith.

Referring for the moment more particularly to FIG. 10, this pivot 128 is shown as engaging cabinet wall 40 and its upward extent is at a small acute angle relative to wall 40.

Referring now to FIG. 3, a lever 129 is pivotably mounted on fulcrum and at its front end is formed with a lug 130 which passes through opening 27 in cabinet wall 26 and functions as a pushbutton to elevate the opposite end of the lever which engages bracket 107. Thus when pushbutton 130 is depressed, panel 105 is moved upward against the bias of spring 113. A pair of leaf springs 131 and 132 have upper end portions in engagement and are clamped against cabinet wall 40 by spring anchor 133 that is secured in position by screw 134. Spring 131 has a cam foot 135 which engages the cam surface 126 on plate 124 to urge panel 104 toward wall 40. If the fiche holder 86 is in position at one end of a so-called horizontal stroke, the pin 125 will engage the vertical indexing pin 104 in that position to raise the fiche holder, overcoming the resilient holding effect of resilient strip 51 due to the cam surfaces 136 on guide bar 52.

The swinging movement of the bell cranks 114 and 115 will cause either of the cam lips 119 or 122 to engage one of the horizontal indexing pins 97 and index the holder one step. Spring 132 carries a locking pin 137 at its free end with portions projecting on opposite sides thereof. Thus, on the rear side, the projecting portion of locking pin 137 rides along the bottom surface of a recess 95 until it reaches the aperture 96 at the end of that recess. When this takes place, a cam surface 138 on the forwardly projecting portion of the locking pin engages the cam surface 127 on plate 124 to force pin 137 into an aperture 96 and lock it in that position. This insures that a particular image on the fiche is accurately positioned with respect to the lenses 71 and 72.

Operation

Figure 11:
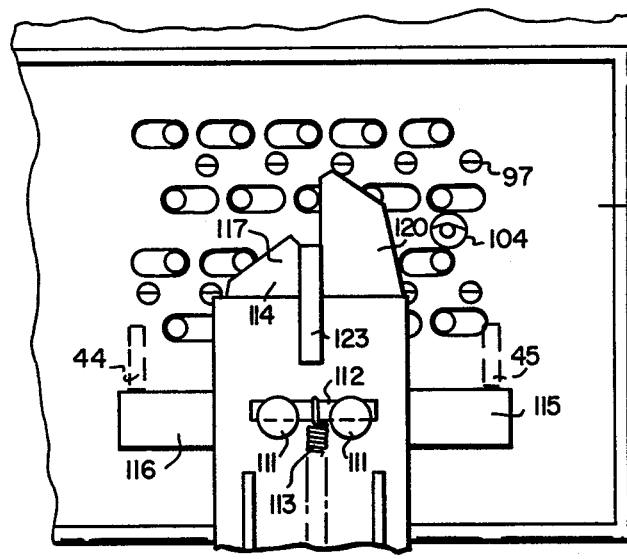
FIG. 11 is a detail on an enlarged scale showing the longer arm of the bell crank in position engaging a horizontal indexing pin for movement of the fiche holder in the direction of the arrow.
Figure 12:
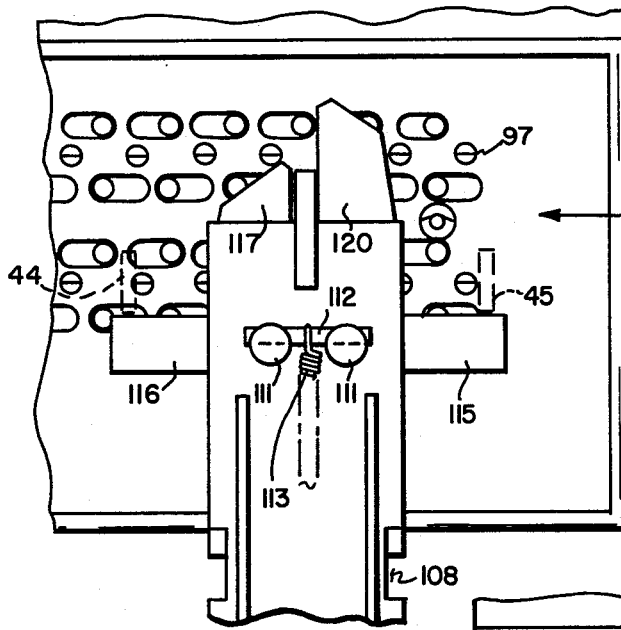
FIG. 12 is a view similar to FIG. 11 showing the cam surface on the short bell crank arm about to engage a horizontal indexing pin for movement in a direction opposite to that shown in FIG. 11 as indicated by the arrow.
Figure 13:
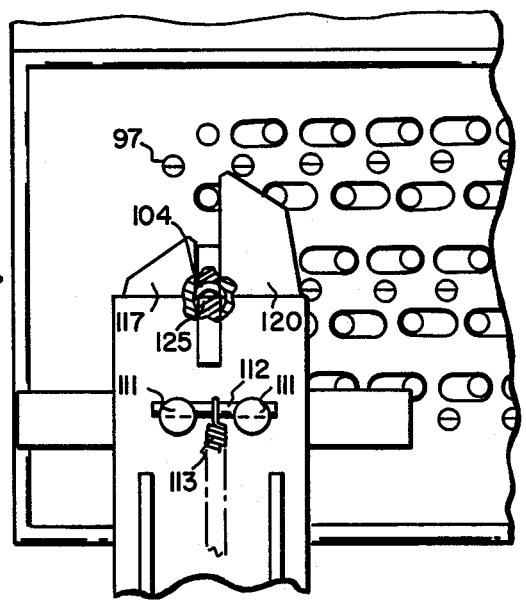
FIG. 13 is a detail illustrating a vertical indexing pin on the fiche holder being engaged by the vertical indexing pin on the actuating panel.

While the mode of operation of the above-described micro fiche indexer is believed to be obvious from the illustrations of the drawings and description of parts set forth above, it is briefly described as follows:

A fiche 85 is first inserted in recess 87 between the transparent layers 90 and the inserting motion continued until the lower edge of the fiche engages the bottom edge 89 of recesses 87 as shown in FIG. 6. Fiche holder 86 is then moved downward until its lower edge engages abutment 63. In this position, guide bar 52 is received in uppermost groove 94. In this position, the image at the right-hand side of the uppermost row on the fiche will be in alignment with the lenses 71 and 72. With the lightbulb 68 energized, the enlarged image is projected onto screen 28 as described above. The viewer then presses pushbutton 130 to raise the panel and cause the cam lip 122 on bell crank 120 to engage a horizontal indexing pin 97 immediately thereabove and move the fiche holder 86 in the direction of the arrow of FIG. 11. Upon release of pressure on the pushbutton 130, panel 105 will be moved downwardly and away from cabinet wall 40 under the influence of spring 113 and gravity action. The same operation occurs until the end of the row designated 112 in FIG. 7 is reached. On the next depression of pushbutton 130, the pin 125 on plate 124 engages a vertical indexing pin 104 to raise the fiche holder 86 one step. During this movement to the right (speaking with reference to the showing in FIG. 11), the cam lip 119 on the short bell crank arm 114 does not engage any pins 97. Upon the next operation of pushbutton 130, the cam lip 122 on the long bell crank arm clears the horizontal indexing pins 97 and the cam surface 119 on the short bell crank arm 114 will engage horizontal indexing pins 97 to move the fiche holder 86 in the direction of the arrow of FIG. 12.

It is noted that while the guide bar 52 remains seated in a groove 94 during horizontal indexing, upon vertical indexing one of the ribs 93 will engage a cam surface on the guide bar to force it outwardly of the groove whereupon, due to the resiliency of the panel 51, the guide bar will snap back into position in the groove immediately below that in which it had been seated.

Microswitch 84 is provided with an operating arm 139 having a roller 140 on its free end which engages actuating panel 105 adjacent to its lower end. When this engagement is maintained, the circuit to lamp 68 is maintained. However, once panel 105 rides off roller 140, the operating arm 139, which is spring biased, will open switch 84 to interrupt the circuit to the lamp 68. Hence, during shifting of the fiche holder, no light shows on screen 38.

While a preferred specific embodiment of the invention has been hereinbefore set forth, it is to be clearly understood that the invention is not to be limited to the exact constructions, mechanisms and devices illustrated and described because various modifications of these details may be provided in putting the invention into practice.

What is claimed is:

1. In a micro fiche indexer for shifting a fiche having a plurality of images arranged in a plurality of vertically spaced horizontal rows:
  (a) a cabinet having a screen mounted in the front thereof;
  (b) a fiche holder in which a fiche is removably positioned and having front and rear faces;
  (c) a plurality of horizontally ribs on said rear face defining horizontal grooves, said fiche holder being positioned in said cabinet opposite said screen;
  (d) an optical system including an electric light, lenses and reflectors for projecting an enlarged image on the fiche onto said screen;
  (e) a pushbutton mounted in the front portion of said cabinet;
  (f) an actuating panel vertically movable in said cabinet and having a portion disposed in front of the front face of said fiche holder;
  (g) a spring having one end connected to said cabinet and its other end to said actuating panel and biasing said panel into its lowermost position;
  (h) operating connections between said pushbutton and said actuating panel for raising the panel against the influence of said spring;
  (i) cooperating indexing elements on said front face of said fiche holder and said actuating panel for shifting said panel horizontally with a step-by-step motion through all of the images in a horizontal row and then vertically from one row to the next-adjacent row by successive operation of said pushbutton; and
  (j) a guide bar received in one of said horizontal grooves and movable upon vertical movement of the fiche holder to be received in the next-adjacent horizontal groove.

2. The micro fiche indexer of claim 1 in which the operating connections between the pushbutton and the lower end of the actuating panel comprises a lever having said pushbutton mounted on one end, a fulcrum on which said lever is pivoted and mounted in the cabinet at the bottom thereof with the end remote from the pushbutton in operative engagement with said actuating panel.

3. The micro fiche indexer of claim 1 in which the indexing elements on the front face of the fiche holder take the form of a plurality of horizontal indexing pins arranged in horizontal rows with the pins in each row being spaced apart a distance the same as the width of an image on the fiche and vertical indexing pins; the indexing elements on said actuating panel comprising a pair of bell cranks pivotably mounted on said actuating panel and having horizontal arms and vertical arms having cam lips at their upper ends whereby the cam lip on one arm engages the horizontal indexing pins in one row to cause indexing of the holder in one direction and the cam lip on the bell crank arm engages the horizontal indexing pins for shifting the fiche holder in the opposite direction; a cam pin on said actuating panel for engaging one of said vertical indexing pins upon upward movement of the actuating panel; and abutment elements on said cabinet which are engaged by the horizontal bell crank arms upon upward movement of the actuating panels to swing the bell cranks on their pivots.

4. The micro fiche indexer of claim 3 together with means for locking the fiche holder in a fixed position upon completion of a horizontal indexing step.

5. The micro fiche indexer of claim 4 in which said locking means comprises a plurality of rows of elongated recesses on the front face of the fiche holder, each of said recesses having a through aperture at one end thereof with the apertures in one row all being at the same relative ends of the recesses in that row and the apertures in the next-adjacent row being on opposite ends of said recesses, and a spring-mounted locking pin adapted to be received in any one of the recesses to ride therealong until the aperture is reached whereupon it enters the aperture to lock to fiche holder in position until the next indexing step.

6. The micro fiche indexer of claim 5 in which said locking pin has a cam face on its forward end together with a plate carried by said actuating panel having a cam face engaging the cam face on the locking pin upon upward movement of the actuating panel to force the locking pin into the aperture at the end of the recess in which it is formed and hold the pin in locking position until the next indexing step is initiated.

7. The micro fiche indexer of claim 1 together with a microswitch that is connected in series with said electric light and having an operating arm that is engaged by said actuating panel to open the microswitch upon upward movement of said actuating panel.

8. The micro fiche indexer of claim 1 in which the cabinet compsises a front part and a rear part together with a wall constituting the rear wall of the front part and the front wall of the rear part and which wall is inclined with respect to the vertical; said front part having a bottom wall and a top wall is shorter than said bottom wall whereby said rear wall of the front cabinet part is inclined towards the front.

9. The micro fiche indexer of claim 8 in which said actuating panel has a lower end in pivotal engagement with the lower end of the rear wall of said front cabinet part and has an upper end portion which under inactive conditions swings away from said rear wall of the front cabinet part; means to limit such swinging movement; and spring means for swinging said actuating panel toward said rear wall of the front cabinet part upon upward movement of said actuating panel.

10. The micro fiche indexer of claim 9 in which said spring means takes the form of a leaf spring having its upper end mounted on the rear wall of said front cabinet part and having a cam foot which engages a cam surface on a plate carried by said actuating panel.

11. The micro fiche indexer of claim 1 in which said guide bar has opposed cam faces which engage said ribs and is mounted at one end of a resilient strip having a lower end secured to the cabinet.

12. The micro fiche indexer of claim 1 in which the electric light is connected to a source of direct current by a switch having an operating member that is adapted for manual engagement.

13. The micro fiche indexer of claim 1 in which the electric light is mounted in a lamp housing having a front wall in which one of said lenses is mounted, the other lens being movably mounted on a slide together with an arm pivotably mounted in said cabinet and having cam elements engaging a complemental element on said slide whereby swinging movement of said arm causes focal adjustment of said lens, the arm having a portion projecting through a hole in the front wall of the cabinet to provide for manipulation to adjust the focal length of the lenses.

14. The micro fiche indexer of claim 8 in which the actuating panel is formed with aligned recesses on its opposite edges together with a pair of strips extending into the cabinet from the rear wall of said front part and tabs on said strips which may be initially passed through said recesses and then in position overlapping edge portions of said actuating panel whereby they limit swinging movement of said actuating panel.

* * * * *